Figure 1:
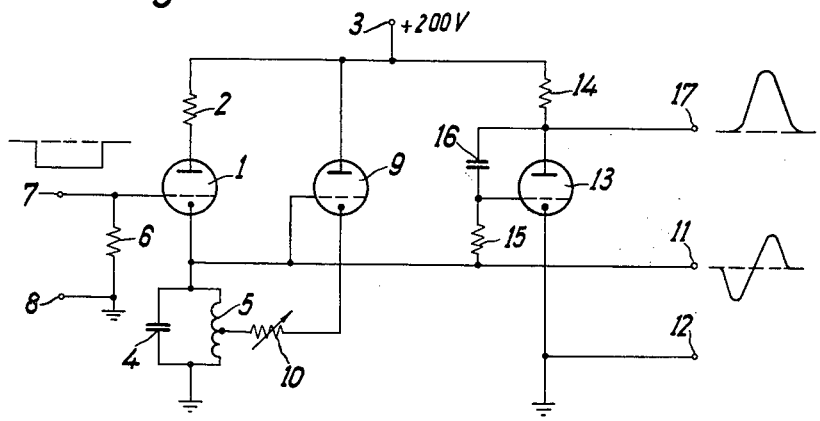

July 10, 1962  K. DINTER  3,044,019
QUADRATURE WAVE GENERATOR
Filed Jan. 11, 1960

Inventor:
KONRAD DINTER
By: George H. Spencer
ATTORNEY

United States Patent Office 3,044,019
Patented July 10, 1962

3,044,019
QUADRATURE WAVE GENERATOR
Konrad Dinter, Konstanz (Bodensee), Germany, assignor to Telefunken G.m.b.H., Berlin, Germany
Filed Jan. 11, 1960, Ser. No. 1,663
Claims priority, application Germany Jan. 15, 1959
4 Claims. (Cl. 328—223)

The present invention relates to an electrical circuit for producing for a limited period of time at least two oscillating voltages mutually out of phase by 90° with a definite beginning and end.

In the art relating to control circuits for cathode ray tubes, as used in radar and TV, A.C. control voltages which are out of phase by 90° are often utilized. Such voltages are particularly useful to deflect a cathode ray beam to produce a circular sweep. For these and other purposes, it is necessary to produce such voltages in definite phase relation to some other signals, and to trigger these oscillating voltages for a measured and fixed length of time, for example, to produce only one complete rotation of the cathode ray sweep. Such necessity arises when unique phenomena are to be recorded, or, in case of electron storage tubes, when the frequency band of periodic radar pulses is to be narrowed.

It is known to produce oscillations of limited time duration by means of ringing circuits comprising an electron tube connected with a voltage source and a parallel resonant circuit. Upon interruption of the steady-state condition of the circuit oscillations are produced. Another electron tube provides feedback action to counteract damping losses. This oscillation comprises the current through the inductance of the resonant circuit which current also is made to flow through a very low value resistor. The voltage across the resistor is in phase with the oscillating current flowing through the inductance, but this voltage is out of phase by about 90° with the voltage across the inductance. The phase error produced by the resistor is cancelled by another capacity of suitable size connected in parallel with the resistor. However, the exact phase relation of 90° is not obtained because this would require an inductance without internal resistance or distributed capacity. This is, however, never attained and, therefore, the oscillator voltage and the voltage taken from the resistor cannot be out of phase by exactly 90°. Furthermore, upon suddenly triggering the electron tube which is connected in series with the resonant circuit, the leading edge of the oscillation is steeper than the steepness of a truly sinusoidal oscillation. This is due to the distributed capacities of the entire arrangement. In addition, the internal capacities in the inductance produce small noise peaks along the entire oscillation curve. These two effects as outlined above appear strongly in the voltage taken from the resistor, because all these disturbances appear in the current through the resistor more than across the inductance which has distributed capacities shunting the effects. Therefore, this known arrangement does not satisfy stringent requirements as to wave shape and phase relation of the two voltages taken across the resistor and across the resonant circuit, respectively.

It is an object of the present invention to provide a new and improved circuit for producing for predetermined time durations at least two oscillation voltages which are out of phase by 90°, free of the errors and disturbances outlined above.

According to one aspect of the invention, in a preferred embodiment thereof, it is an object to provide a parallel resonant circuit connected in series with an electronic switch, such as a tube or transistor, and with a D.C. voltage source feeding a current through the switch and the inductance of the resonant circuit, means being provided to pulse the switch with a rectangular trigger or gating pulse to disconnect the resonant circuit from the voltage source. A regenerative feedback circuit supplies damping energy losses to the oscillations produced by the resonant circuit after it has been disconnected from the D.C. voltage source. The oscillations thus produced are fed to output terminals and also to an integrator comprising a series resistor and capacitor, said capacitor being connected across the anode of an electron tube to its grid and its grounded cathode. The voltage taken from the anode is out of phase with the input voltage by exactly 90°. Any brief disturbances produced in the switching arrangement are weakened and suppressed in this arrangement.

In a preferred embodiment, the inductance of the resonant circuit is a transformer, the primary of which is connected in series with the electronic switch and the first one of the two output oscillating voltages is produced across the secondary.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 2:
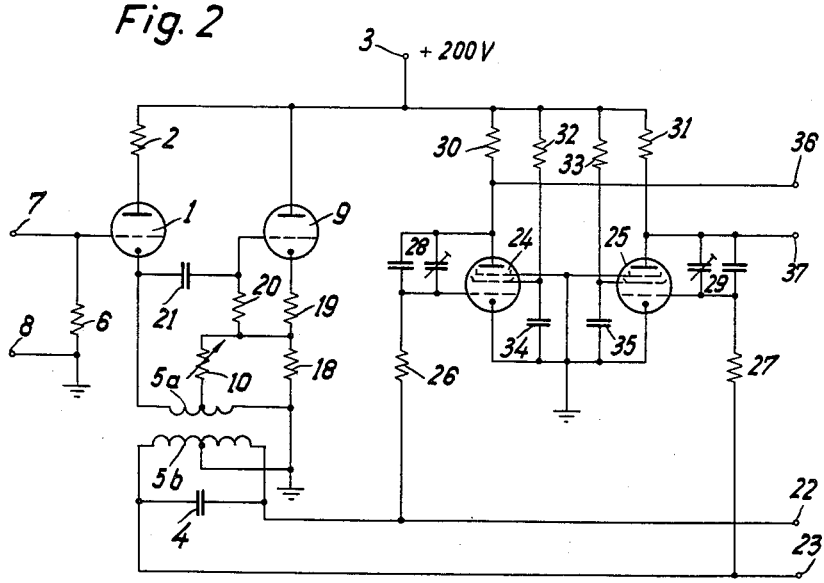

In the drawings:
FIGURE 1 is a circuit diagram of an embodiment of the invention, and
FIGURE 2 is a simplified circuit diagram of a preferred embodiment of the invention.

In FIGURE 1, a triode 1 is connected via a resistor 2 to the positive terminal 3 of a D.C. positive voltage supply source of 200 volts (not shown). The negative terminal is grounded. The cathode of triode 1 is connected to ground through a parallel resonant circuit comprising a capacitor 4 and a center-tapped inductance 5. Elements 1 to 5 comprise a so-called ringing circuit. The control grid of triode 1 is grounded via a resistor 6 across which resistor negative rectangular pulses may be applied from input terminals 7 and 8. In the absence of such a control pulse, a strong D.C. current flows through the tuned circuit 4 to 5, the resistor 2 and the triode 1, current also flowing through resistor 6 to ground. Thus, there is stored in this coil electric energy. The amount of current producing such energy-storage is predominantly determined by resistor 2.

Upon application of a negative, rectangular pulse across resistor 6, this current is interrupted and the stored energy in coil 5 is released. The current through coil 5 would decay as a series of damped oscillations if no other provision were present. To avoid this damping effect, another tube 9 is provided and has its grid connected to the ungrounded side of the resonant circuit 4 to 5 and its cathode is connected to the center tap of coil 5 via an adjustable resistor 10. The anode of tube 9 is connected to the positive terminal 3 of the voltage supply source. Elements 9 and 10 are a regenerative feedback circuit, the action of which is adjusted by resistor 10 to the point at which the damping of the oscillation is just cancelled by the amplifying effect of the tube 9. The output terminal of this circuit is denoted by 11, 12 being the other output terminal which is grounded. Between terminals 11 and 12 undamped oscillations appear as long as a negative pulse is present at terminals 7 and 8.

Terminal 11 is also connected to a resistor 15 which is connected in series with a capacitor 16 of a socalled Miller integrator, including also a triode 13 and an anode resistance 14 which is connected to the voltage supply source. Capacitor 16 is connected between the anode and the grid of triode 13. The output of this circuit is taken from the anode of this triode 13 at terminal 17. This output voltage oscillates between two voltage levels with respect to ground, said levels being determined by resistor 14, by the voltage of the supply source, by the capacitor 16 and by the amplitude and frequency of the oscillation fed to grid 13 via resistor 15. The oscillating voltage taken from terminal 17 is 90° out of phase with the voltage taken from terminal 11.

In FIGURE 2, elements 1 to 4 and 6 to 10 denote the same elements as those carrying the same reference numerals in FIGURE 1. However, the inductance of the resonant circuit in this figure is a transformer having a primary 5a and a secondary 5b. Capacitor 4 is connected across the secondary 5b from which the oscillations are fed to output terminals 22 and 23, none of these terminals being grounded. The feedback circuit including tube 9 for cancelling the damping comprises additionally a resistor 18 connected with one side of the primary winding 5a, the resistor 10 being connected to the center tap of the primary 5a. A cathode resistor 19 is connected to one side of resistor 18, the other side of the latter being grounded. The junction of resistors 18 and 19 is connected to grid resistor 20. The resistor 19 provides suitable grid bias. The grid of tube 9 is connected to the cathode of tube 1 via a capacitor 21.

With this arrangement, one can center tap the output circuit of the oscillator (secondary 5b) which center tap is grounded. Thus, the voltages produced at terminals 22 and 23 are out of phase by 180° with respect to ground. Such oscillating voltages are useful, for example, as deflecting voltages in cathode ray tubes.

Furthermore, in this circuit, the tuning capacitor 4 is connected across the secondary of the output transformer. It thus is decoupled galvanically from the control circuits of tubes 1 and 9. With this arrangement, the curve shape of the oscillations produced is improved and, particularly, the leading edge of the first oscillation corresponds exactly to the form of a sinusoidal voltage when a gate pulse is applied to the switching tube 1.

The voltages at terminals 22 and 23 are also fed to two integrators, respectively including pentodes 24 and 25 having grid-input resistances 26 and 27, respectively connected in series with capacitors 28 and 29. The capacitors here include equalizing trimmers. Tubes 24 and 25 have anode resistors 30 and 31, respectively, which are, in turn, both connected to the positive terminal of the voltage supply source. The cathodes of pentodes 24 and 25 are grounded. The screen grids of tubes 24 and 25 are connected to the positive terminal 3 via resistors 32 and 33, respectively, and they are by-passed to ground by capacitors 34 and 35, respectively. Terminals 36 and 37 are connected to the anodes of the pentodes 24 and 25.

The voltages taken from terminals 36 and 37 are out of phase by 180° with respect to ground, but out of phase by 90° with respect to the voltages at terminals 22 and 23, respectively. Thus, quadrature voltages appear in sequence at the output terminals 36, 22, 37 and 23.

I claim:
1. An electrical circuit for producing at least two substantially sinusoidal voltages mutually out of phase by 90° for the duration of each of a series of predetermined input trigger pulses, said circuit comprising:
   (a) a source of power;
   (b) a normally conductive electronic switching means;
   (c) a parallel resonant circuit including a shunted inductance in the form of a transformer having primary and secondary windings and a tuning capacitor connected across said secondary winding, said resonant circuit being arranged in series with said switching means across said source to store electric energy in said inductance with said primary winding being connected to said switching means;
   (d) a regenerative feedback circuit arranged across said resonant circuit and connected to said primary winding thereof;
   (e) means connected with said switching means for applying thereto a pulse, thereby to render said switching means nonconductive;
   (f) a first output terminal connected to said resonant circuit;
   (g) feedback integrating circuit means connected to said first output terminal;
   (h) means for connecting said secondary winding to said feedback integrating circuit means;
   (i) a second output terminal; and
   (j) means for connecting the output of said feedback integrating circuit means to said second terminal.

2. In an electrical circuit according to claim 1, said secondary winding including a grounded center tap, one side of said secondary being connected to said first terminal, and a third output terminal connected to the other side of said secondary.

3. In an electrical circuit according to claim 2, second feedback integrating circuit means galvanically connected to said third output terminal and including a fourth output terminal.

4. The electrical circuit defined in claim 1 wherein said feedback integrating circuit means comprises an amplifier and a resistance-capacitor circuit connected thereto.

References Cited in the file of this patent
UNITED STATES PATENTS 2,659,009     Emslie _____ Nov. 10, 1953
2,749,502     Ragazzini et al. _____ June 5, 1956

OTHER REFERENCES

Chance et al.: Waveforms, vol. 19, MIT Radiation Laboratory Series, McGraw-Hill Book Co., Inc., 1949, pages 156–158.